United States Patent [19]

McGuire

[11] Patent Number: 5,048,174

[45] Date of Patent: Sep. 17, 1991

[54] METHOD AND APPARATUS FOR LINING A BURIED PIPE WITH A POLYMER LINING

[75] Inventor: Brian E. McGuire, Shaw, England

[73] Assignee: British Gas plc, London, England

[21] Appl. No.: 508,529

[22] Filed: Apr. 12, 1990

Related U.S. Application Data

[63] Continuation of Ser. No. 349,074, May 9, 1989, abandoned.

[30] Foreign Application Priority Data

| May 9, 1988 | [GB] | United Kingdom | 8810891 |
| May 9, 1988 | [GB] | United Kingdom | 8810892 |
| May 9, 1988 | [GB] | United Kingdom | 8810893 |
| May 9, 1988 | [GB] | United Kingdom | 8810894 |
| May 9, 1988 | [GB] | United Kingdom | 8810897 |
| Aug. 11, 1988 | [GB] | United Kingdom | 8819063 |

[51] Int. Cl.$^5$ .............................................. F16L 55/18
[52] U.S. Cl. .................... 29/451; 29/402.09; 138/97
[58] Field of Search ............. 29/234, 235, 402.2, 29/402.09, 450, 451; 138/97, 98; 264/230; 493/271, 293

[56] References Cited

U.S. PATENT DOCUMENTS

| 2,110,783 | 3/1938 | Welker | 29/235 X |
| 3,462,825 | 8/1969 | Pope et al. | 29/451 |
| 4,504,171 | 3/1985 | Florence, Jr. | 29/234 X |
| 4,777,984 | 10/1988 | Storah | 138/98 |

FOREIGN PATENT DOCUMENTS

| 2096557 | 6/1971 | France . |
| 807413 | 6/1956 | United Kingdom . |
| 2186340 | 1/1987 | United Kingdom . |

OTHER PUBLICATIONS

"Underground"; Sep., 1987; pp. 24 and 25.

Primary Examiner—Joseph M. Gorski
Attorney, Agent, or Firm—Larson and Taylor

[57] ABSTRACT

A liner 30 of polyethylene housing an SDR of 33 or less is pulled through a die 36 and through the pipe 10 and allowed to revert to the internal diameter of the pipe. The force of pulling is half the yield strength of the liner or less. The die has an entry; a throat and an exit, the entry decreasing in diameter towards the throat and the exit increasing in diameter away from the throat. The liner has a maximum diameter before the die, a minimum diameter in the die and intermediate diameter after the die. The liner bending inwards before first contacting the die at the entry, then continuously bending through its minimum diameter as it passes the throat and then undergoing die swell resulting in said intermediate diameter. The throat is defined by the merger in a continuous curve of a radius joining the entry and a radius joining the exit.

16 Claims, 6 Drawing Sheets

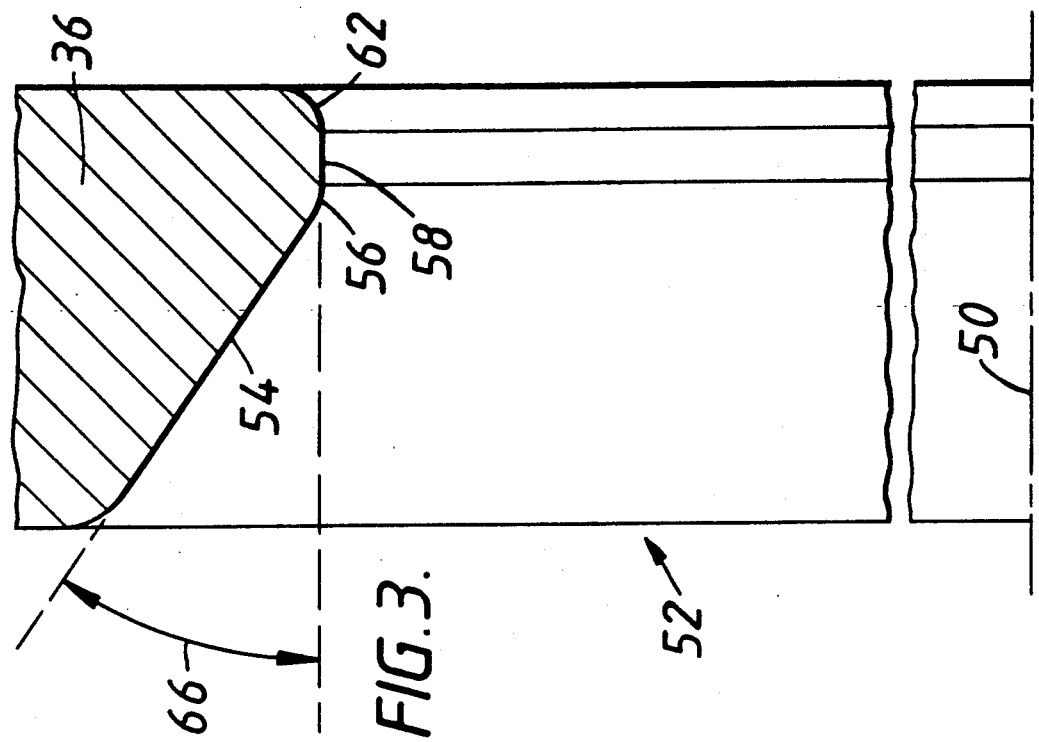
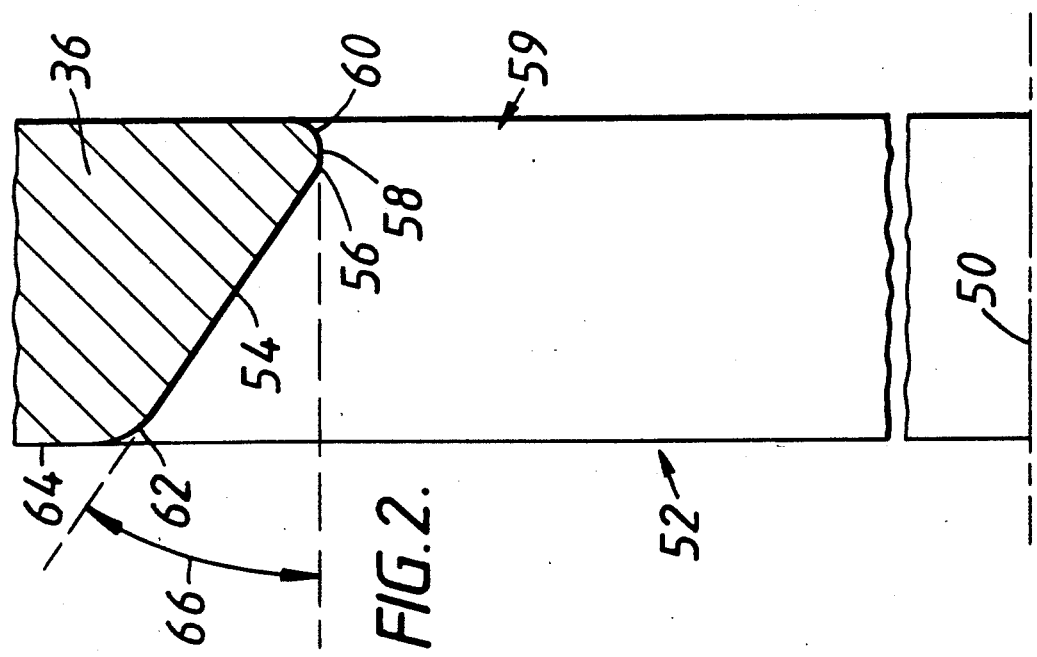

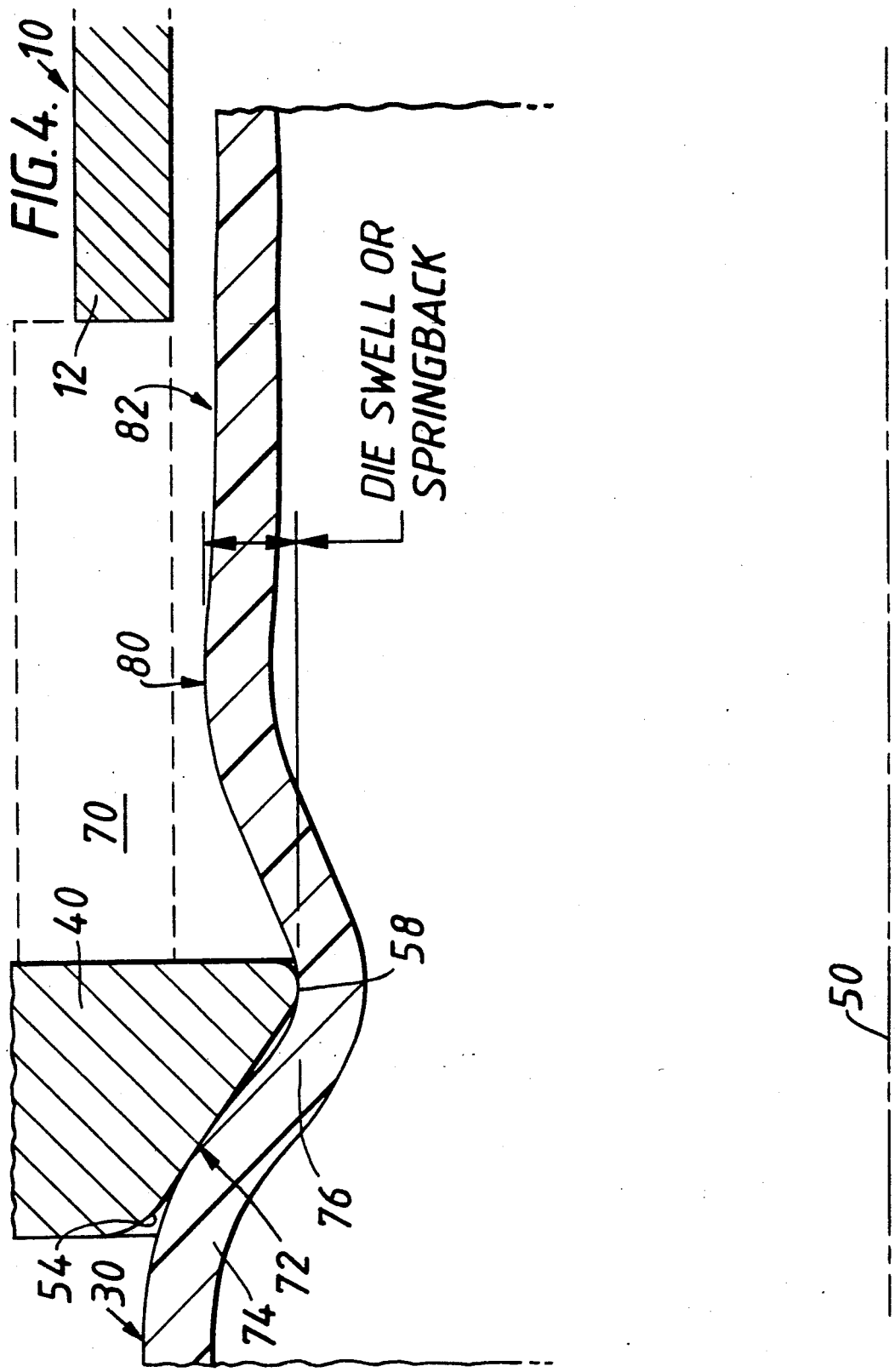

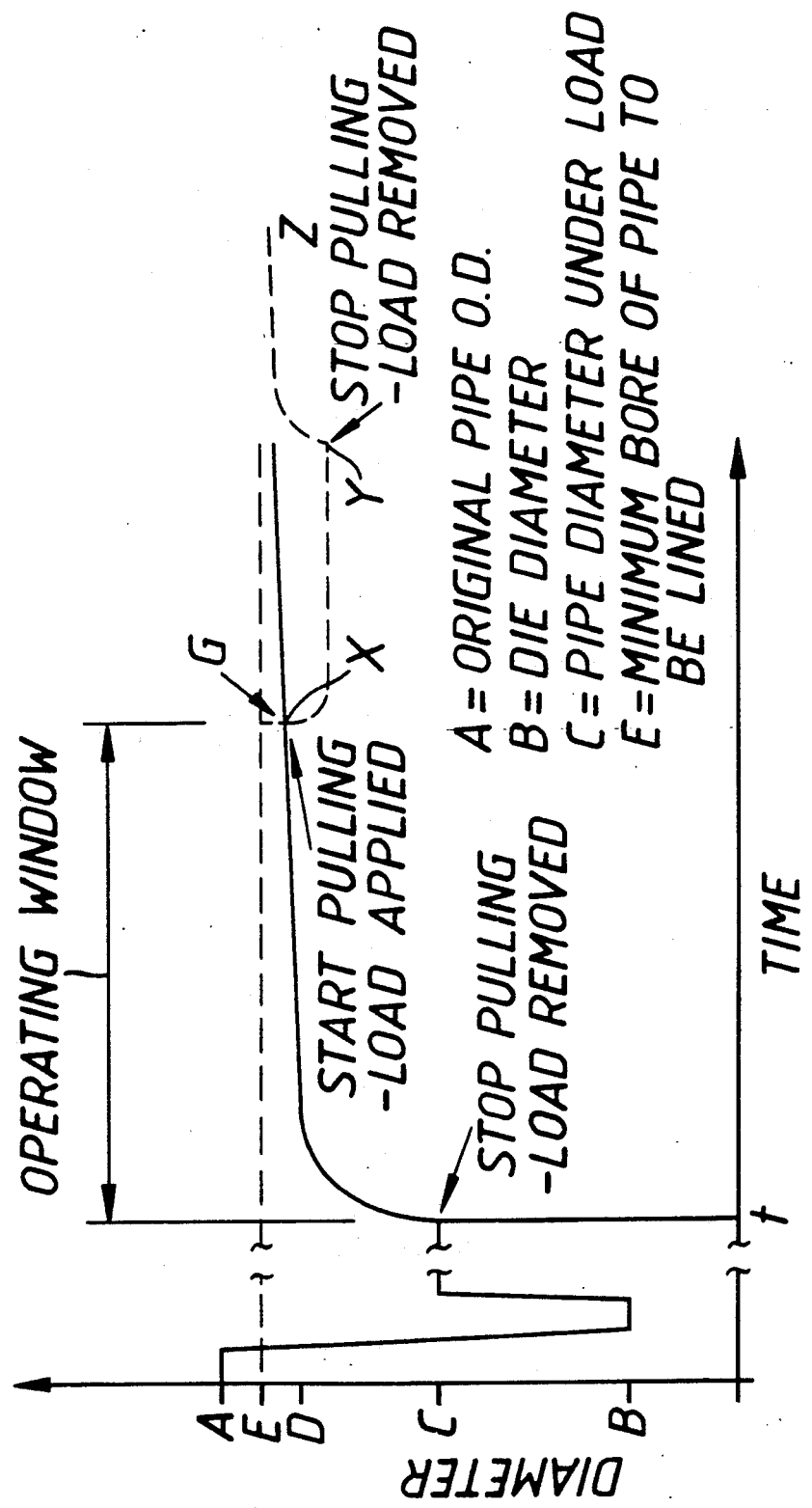

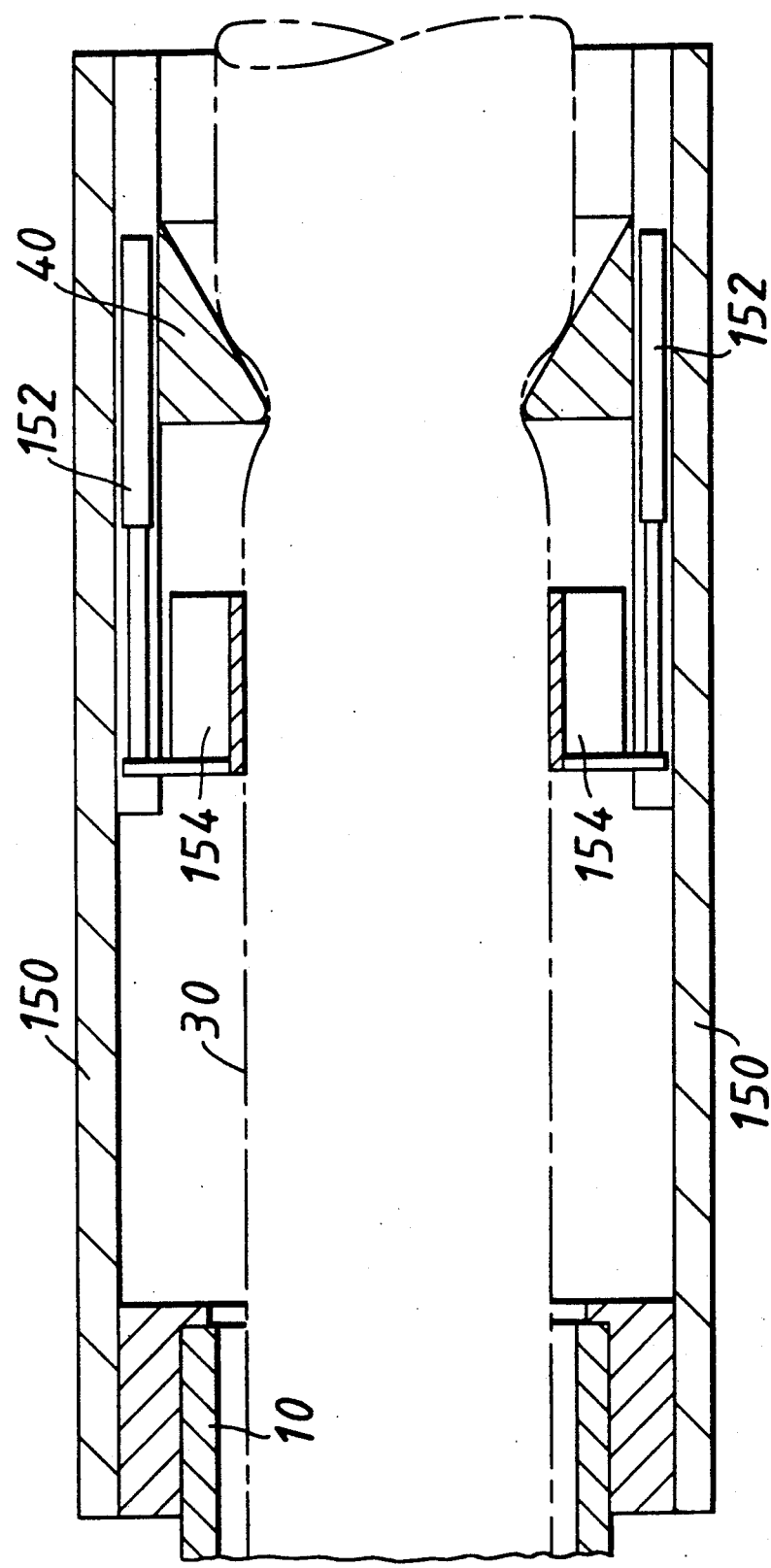

METHOD AND APPARATUS FOR LINING A BURIED PIPE WITH A POLYMER LINING

This application is a continuation of application Ser. No. 07/349,074 filed 9 May 1989 and now abandoned.

The invention relates to a method of and apparatus for lining a buried pipe with a polymer liner.

The method is applicable, for example, to lining a buried gas, water or sewage pipe. Such pipes are made of cast iron or steel or particularly, in the case of water, of asbestos cement or concrete for example, and particularly cast iron pipes may be lined with bitumen or concrete.

In British patent application publication No. 2186340 there is described a method applicable to buried gas, water or sewage pipes in which a length of synthetic resin liner is heated, pulled through a die and through the pipe to be lined and pressurised to cause it to expand into engagement with the internal wall of the pipe.

In U.S. Pat. No. 3 462 825 (Pope et al) there is described a method applicable to the lining of flexible or rigid pipes in the factory by pulling a liner through a die and through the pipe and then releasing the liner pipe, whereupon the liner pipe expands into tight engagement with the internal wall of the pipe. The pipe was of relatively small diameter, having an inside diameter of 2.06 inches (51.5 millimeters) and the liner pipe had an outside diameter of 2.3 inches (57.5 mm). The liner pipe was relatively thin, having a wall thickness of 0.07 inch (1.75 mm) giving a Standard Dimension Ratio (SDR) of 33. The liner pipe was of fluorocarbon. In general, the outside diameter of the liner pipe was 10 to 15% greater than the inside diameter of the pipe to be lined.

In British patent specification No. 807 413 (Tubovit Societa per Azioni) there is described a method applicable to the lining of metal pipes in the factory by pulling a heated liner pipe through a die and through a pipe to be lined, releasing the liner pipe, and heating the liner pipe. The die diameter is the same as the pipe to be lined or very slightly less. The liner is of polyvinyl chloride very slightly larger than the pipe to be lined and is 3mm thick or less. The liner is heated before or during the die reduction to a temperature at which it is relatively soft and the force used to pull it through the pipe is only relatively low.

In GB 2186340 such die swell as does occur after the main die is eliminated by the effect of the second die which makes the diameter of the throat, in each case, the diameter which goes into the pipe. In U.S. Pat. No. 3 462 825 and GB 807 413, no die swell is shown and the diameter which goes into the pipe is the diameter of the throat. Die swell is the increase in diameter which the liner undergoes, according to the present invention, after passing through the die.

A method of lining a pipe with a polymer liner, according to the invention, comprises pulling an unsupported length of liner through a die without causing yielding and to reduce its diameter with longitudinal extension, and through the pipe and on removal of the pulling load allowing the liner to revert to at least the minimum internal diameter of the pipe, and the die having a central, longitudinal die axis and comprising an entry, a throat and an exit which are symmetrical about said axis, the entry decreasing in diameter towards said throat and the exit increasing in diameter away from said throat, the liner having outer and inner maximum diameters before the die, outer and inner minimum diameters in the die and outer and inner intermediate diameters after the die, the force of pulling being such as partially to restrain die swell of the liner after its emergence from the throat, the liner bending inwards before first contacting the die at the entry, then leaving the entry before continuously bending through its minimum diameter as it passes the throat, and then undergoing die swell resulting in said intermediate diameter, which freely enters the pipe.

The throat may be defined by the merger, in a continuous curve, of a radius joining the entry and a radius joining the exit.

Alternatively, the throat may comprise a short cylindrical section not more than one centimeter in length which is joined by a radius to the entry and joined by a radius to the exit.

Preferably, the entry makes an angle of 12.5 degrees with the die axis.

Apparatus, according to the invention, for lining a pipe with a polymer liner comprises a die, means for anchoring the die in front of the pipe, pulling means, and means for anchoring the pulling means after the pipe, the die having a central longitudinal die axis and comprising an entry, a throat and an exit which are symmetrical about said axis, the entry decreasing towards said throat and the exit increasing in diameter away from said throat, the liner having a maximum diameter before the die, a minimum diameter in the die and an intermediate diameter after the die.

The throat may be defined by the merger, in a continuous curve, of a radius joining the entry and a radius joining the exit.

Alternatively, the throat may comprise a short, hollow cylindrical section parallel to the die axis of not more than one centimeter in length which is joined by a radius to the entry and joined by a radius to the exit.

One method of lining a buried pipe will now be described by way of example with reference to the accompanying drawings, in which:

FIG. 2 is an enlarged vertical part-section through a die;

FIG. 3 is an enlarged vertical part-section through a modified die;

FIG. 4 is an enlarged vertical part-section through the die and through the liner pipe as it is passing through the die;

FIG. 5 is a graph showing diameter plotted against time for the liner pipe as it passes through the die;

FIG. 7 is a vertical section through the die shown supported by the entry end of the pipe to be lined together with pushing means.

From now on, the liner pipe will be referred to as "the liner" and the pipe to be lined will be referred to as "the pipe".

Figure 1:
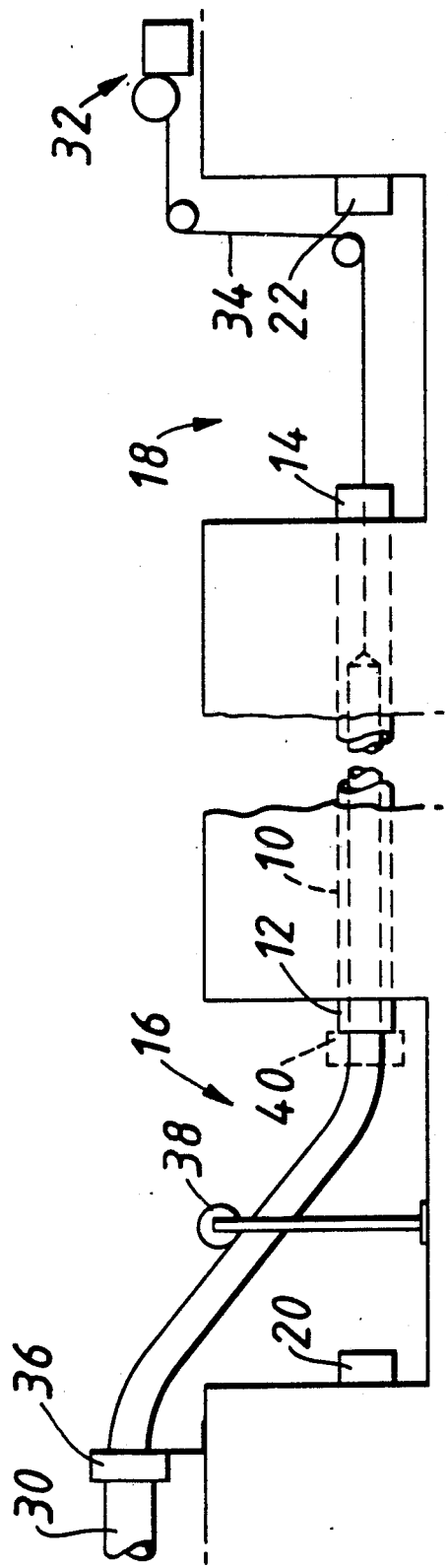
FIG. 1 is a vertical section through the ground showing the pipe to be lined and showing a liner pipe in the course of being pulled through the pipe to be lined.

FIG. 1 shows the buried pipe 10, which in this case may be for example a cast-iron gas main, with its ends 12,14 exposed at two excavations 16,18. The pipe continues at 20,22 and pieces have been removed at the excavations 16,18. Eventually, the whole pipe will be lined and the liner joined up to make a continuous main.

The liner 30 is made of polyethylene and is pulled by a winch 32 and cable 34 through a swaging die 36 and through the pipe 10. The liner 30 after emerging from the die 36 is guided by a roller 38 to facilitate entry into the end 12 of the pipe 10. The die 36 is secured by members (not shown) driven into the ground. In another alternative position, the die 40 is supported by direct engagement with the end 12 of the pipe 10, or with members engaging the end 12. The winch 32 also has to be secured by members (not shown) driven into the ground, or from the end of the pipe 14.

Prior to the operations shown in FIG. 1, the pipe was cleaned and checked for internal size by suitable pigs passed through the pipe. At the same time, any protrusions were removed from within the pipe. The liner was made up of lengths of liner above ground. The lengths of liner were joined end to end by butt fusion and the external bead at each fusion joint was removed or directly inserted from a coil of liner (this being the case in sizes up to 180 mm, for example). A pulling cone was attached to the leading end of the liner. The cable 34 was attached to the end of a stiff rod and the rod was pushed through the pipe 10 from the end 14 to the end 12 until the cable end (at the trailing end of the rod) emerged at the end 12. The cable 34 was disconnected and fed through the die 36 and attached to the cone on the liner. The winch 32 was then operated to draw the liner through the die 36, with the longitudinal extension of less than 10%, preferably 8%.

The operator of the winch keeps the winch turning at a constant rate, or nearly so. The rate of advance of the liner 30 may for example be 3 meters per minute.

When pulling is completed, the liner is allowed to revert at least to the minimum internal diameter of the pipe. The liner is cut leaving sufficient pipe to enable a suitable connection to be effected. Where the die position 40 is used, a split die is essential. The winch cable 34 is removed from the liner 30 which is then cut to allow sufficient length to accommodate contraction as the liner reverts.

It is a particular advantage of using the present method that the length of pipe 10 can be lined even where the pulling has to be interrupted for any reason. For example, the winch may fail and require attention. This means that the pulling tension in the cable 34 is removed, with the liner 30 at rest part-way through the pipe, while a repair is effected for example. Then, the pulling tension is again applied and the liner 30 again advances through the pipe 10. The period required for such an emergency can vary but for the lining of buried gas pipes it is considered that a period of 30 minutes should be provided, for example.

During such a break in pulling, the liner pipe increases in diameter. If the diameter of the liner increases so that it approaches the internal pipe wall then frictional forces on restarting the operation of pulling are so high as to prevent the pipe moving without yielding.

FIG. 2 shows the die 36 in greater detail. It has a central die axis 50 passing through the mid-point of the die and normal to the plane of the die. The die is usually of steel but may be of cast iron or sintered polyterafluoroethylene and has a circular opening 52 forming an entry 54, a throat 58 and an exit 59, all of which are symmetrical with respect to the central longitudinal die axis 50. The entry 54 preferably makes an angle between 10 degrees and 15 degrees with the axis 50 in this example it is 12.5 degrees to the axis 50, the angle being shown at 66. The throat 58 is defined by the merger, in a continuous curve, of a radius 56 joining the entry 54 and by a radius 60 joining the exit 59. The entry 54 is joined by a radius 62 to merge with the vertical, planar face 64 of the die 36.

For the present example, the liner 30 is polyethylene of the grade known as PE-A supplied by DuPont (UK) Ltd., and made from DuPont Company Ltd. material sold under the Registered Trade Mark "Aldyl A". The liner 30 has an external diameter of nominally 215 millimeters and a Standard Dimension Ratio of 26. The liner is used to line a spun cast grey iron main having a nominal bore of 8 inches (203.2 mm). Owing to variations in the wall thickness of the cast iron, the bore may vary between 209.8 mm and 218.4 mm. Accordingly, the die 36 has a diameter of 188.7 mm at its throat 58. The diameter of the liner at exit from the die is 197.5 mm. On release of the load the liner diameter increases to 209.4 mm after 1 hour and 210.9 mm after 24 hours. The throat diameter of an unlubricated die is preferably between 8-12% less than the original liner diameter 30, to keep the pulling load below half yield. However, the throat may be relatively smaller, for example 18% less when lining a 4-inch pit cast iron main with 110 mm liner of polyethylene.

The pipe 10 may be of 4 inches (101.6 mm) up to 12 inches (304.8 mm) or more in internal diameter. For gas pipe, the typical sizes are 6 inch (152.4 mm); 8 inch (203.2 mm); 10 inch (254 mm); and 12 inch. As stated above, the minimum internal diameter of such cast iron pipes varies greatly. In order to reduce the problem it is convenient to have available a range of dies to suit both the size and the type of pipe being lined. For example, on 12 pipe, a 285 mm die is used for Class "B" and Class "C" pipe and a 278 mm die is used for Class "D" pipe. Such pipes are of spun, cast grey iron. Class "B" is commonly used for gas pipes and Class "D" for water pipes.

In a modification shown in FIG. 3, the die 36 has a short cylindrical section forming the throat 58. Typically, for example, the cylindrical section is 8 mm long and is joined by a radius at 56 to the entry 54 and by a radius at 62 to the exit 59 of the die 36. The throat 58 has a diameter of 188.7 mm.

The exit 59 in both cases, is such as to minimise the area of the die 36 engaged by the liner 30 as it leaves the die 36. The exit 59 has a radius such that the throat 58 is the last point at which the die 36 contacts the liner 30.

FIG. 4 shows the behaviour of the liner 30 as it passes through the swaging die 40. For simplicity it is assumed the die 40 is at the alternative position shown in FIG. 1. The die 40 can be located relative to the end 12 of the pipe 10 by locating members, one of which is shown at 70. However, the behaviour would be exactly the same if the die were at the position 36 shown in FIG. 1.

As is shown in FIG. 4, the liner 30 engages the die 40 at its entry 54 at the area 72, the liner wall 74 having bent inwardly to do so. Continuing to bend inwardly, the wall 74 leaves the entry 54 in the zone 76. Then, the wall bends continuously through its minimum diameter as it passes the throat 58. The liner then undergoes "die swell" until it reaches its maximum diameter at 80. After the point 80 the wall 74 bends inwards very slightly to the diameter shown at 82.

FIG. 4 also shows the end 12 of the pipe 10 into which the liner 30 is pulled by the tension in the cable 34.

The increase in diameter which the liner 30 undergoes after passing through the die 40 is known as "die swell". The exact amount of die swell is the difference between the diameter at 80 and the minimum or throat diameter at 58 of the die 40. It is more practical to measure the liner diameter at a greater distance from the die 40 i.e. to measure the diameter 82 and call die swell the difference between the diameter at 82 and the minimum or throat diameter at 58 of the die 40.

The die swell has to be taken account of in choosing the parameters of the present invention. Thus, in this invention, it is the diameter of the liner, including die swell, which is chosen to be less than the minimum bore diameter of the pipe 10.

The pulling force is kept preferably at about half the yield strength of the liner, and the die 36 or 40 is dimensioned to ensure that the die swell is just at the correct value. Preferably, the choice is made to allow the liner 30 to be pulled into the pipe 10 with a "window" to allow the pull to be stopped for say, for example, 30 minutes if necessary.

The die acts as means of reducing the liner diameter through its profile and frictional resistance. Work on the liner is primarily bending. The liner first makes contact with the die entry, the liner must then break away from this surface to enable further bending to take place as it passes through the die throat. The liner finally bends to its final diameter on the exit side of the die as it comes under the influence of the applied load. The complex bending stresses experienced by the liner are felt to be the main feature contributing to the performance of the invention. Throughout its passage through the die the liner remains circular on any plane, and no plastic flow occurs.

FIG. 5 shows the time after the release of load plotted along the axis of abscissas and the diameter of the liner 30 plotted along the axis of ordinates. The liner 30 has a diameter represented as A. As the liner 30 passes through the entry 54 of the die 36 or 40, the diameter decreases to the value B, which corresponds to the throat 58. Beyond the throat 58 the diameter increases to the value C, which corresponds to the diameter 80 in FIG. 4. The slight decrease in diameter to 82 is not shown in FIG. 5. At time equal to "t", the load is removed. The diameter increases very rapidly to the diameter D and then much more slowly, over a period of some 24 hours, to the value E. The diameter at E represents the minimum internal diameter of the pipe 10.

Diameter 82 (in FIG. 4) is dependent upon the die throat diameter B and the load in pulling the liner through the die. If the load was very small then the diameter 82 would be very similar to the diameter D.

The ideal situation is one which produces a maximum clearance between liner and pipe internal wall under a load which is below half yield in the material of the liner. On releasing this load a controlled recovery takes place allowing the liner gradually to come into contact with the pipe internal wall.

If the liner is preheated before pulling into the pipe, the resultant liner is tapered with a minimum diameter at the winch end and a maximum diameter at the die end. Longitudinal strains along the liner also vary. The resultant liner following pulling into the pipe without the application of heat is of a fairly uniform diameter along its length and is of uniform longitudinal strain. The difference in performance between the two methods can be explained by creep of the liner whilst under load at the higher temperature.

If the pull has to be stopped and the load removed for any reason, e.g. winch or cable failure, the liner recovery should not be so great to cause the liner to expand against the pipe internal wall. In practice it has been found that the majority of faults can be rectified within 30 minutes. It is preferred therefore that the die design and the loads required will produce a window of 30 minutes before the liner engages the pipe internal wall around its full circumference.

On restarting the pulling operation, the leading end will not reduce to its original diameter C. The reduction obtained is only due to the Poisson's ratio of the material. This is shown in FIG. 5. The broken line between X and Y shows the characteristic. The continued broken line Y to Z shows the characteristic for the reversion of the liner following a halt to pulling after a repair. Clearly, the point X is the latest possible to resume pulling. The clearance shown at G was the smallest permissible to avoid high friction with the pipe internal wall. The material passing through the die on re-starting the pull is at diameter C. On completion of the operation the pipe recovers to the same dimension, i.e. the pipe internal wall, throughout its whole length.

The liner is normally passed through the die without preheating. When the weather is cold, it may be necessary to pre-warm the liner to bring its temperature up to for example 30° C. In that case, the equipment that would be used, for example, is the heater shown in the aforementioned GB patent application publication No. 2186340.

The method enables over 90% of the gas carrying capacity of the pipe to be retained when the pipe is lined as explained herein. For example, using liner of SDR=26 for lining gas pipe, tests have shown that up to 93.5% of the gas carrying capacity of the gas pipe can be used for pipe up to 315mm.

Figure 6:
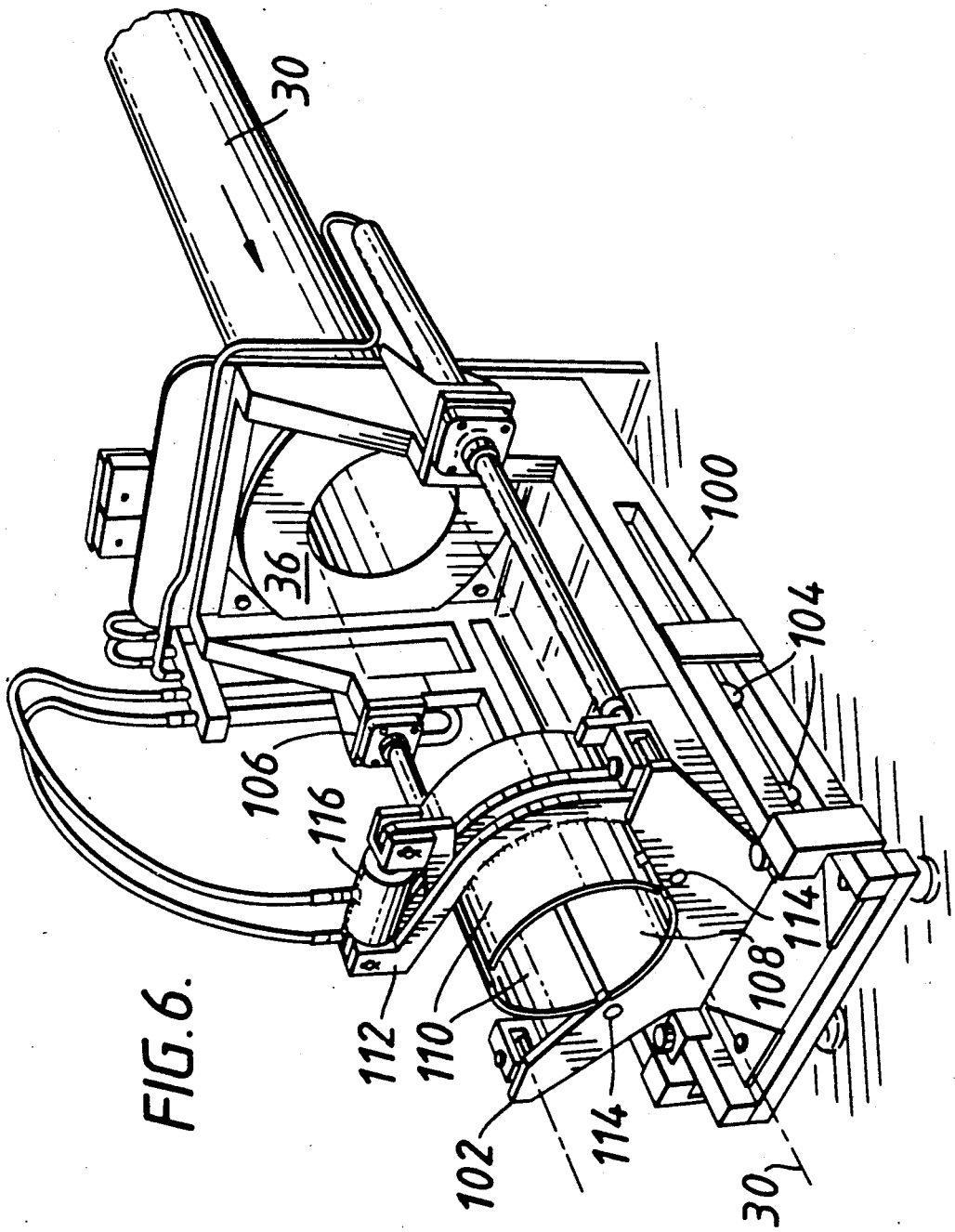
FIG. 6 is an isometric view of a pushing device in position for use adjacent the die.

The overall towing force can be reduced by the use of a liner pushing device positioned preferably after the die, especially where the liner is 268 mm or 315 mm and above. FIG. 6 shows an example of such a device. It consists of a support frame 100 secured to the die or the die support frame. The frame 100 supports a carriage 102 running on rollers 104 and movable backwards and forwards by hydraulic cylinder 106. The carriage 102 supports a fixed lower jaw 108 and two movable jaws 110. The jaws 110 are carried by arms 112 pivoted on pins 114 and movable by a hydraulic cylinder 116.

The carriage 102 is shown in the position in which, in use, the jaws 108, 110 are released from the liner 30. The cylinders 106 next retract, the jaws 108, 110 are closed by the cylinder 116 and the cylinder 106 extend again to push the liner 30 towards the pipe 10 in the direction of the arrow shown.

An alternative position for the pushing device is as shown in FIG. 7 downstream of the die 36 or 40. In FIG. 7 the die is at position 40. It is supported on the end of the existing cast iron or other pipe 10 by struts 150. Pushing hydraulic cylinders are shown at 152. The gripping jaws are shown at 154. The hydraulic cylinder for actuating the jaws is not shown, for simplicity. The die 40 is split, for example into two halves, and can be removed from the liner 30 when pulling through the pipe 10 is completed.

Whether the pushing device is used or not, an approved lubricant can be used to reduce friction between the liner and the pipe. The lubricant can be water or a water-based lubricant, for example.

It may be preferable to use lubricant at the die to reduce friction. The lubricant may be water or a water-based lubricant. Alternatively, a non-aqueous lubricant, such as CASTROL D416 (CASTROL is a Registered Trade Mark) or monoethylene glycol, for example. The lubricant is applied to the die inner surface where it is wiped by the liner 30. Alternatively, it is applied to the surface of the liner 30.

For example, the lubricant may be projected from an annulus surrounding the liner 30. For example, jets or sprays of liquid lubricant may impinge on the liner 30. Alternatively, the ring may have an inwardly projecting brush or swab which bears on the liner 30.

Depending upon the load derived by pulling the liner through the die it may be preferable to lubricate the liner as it enters the pipe and not on the entry to the die.

The die at its internal swaging surface may be machined down to N7 or N6 finish at least example. Preferably, the finish is N5 or N4 or lower.

Three examples below of lining gas pipes with a polyethylene liner are given below. The liner was grade X, commonly known as PE-X in each case. The third manufacturer of the resin liner was Stewarts & Lloyds Plastics, a division of Victaulic plc. In the first two examples, the expected bore was less than the liner diameter after 30 minutes. Therefore, less than 30 minutes would have been available for any repair involving a halt in pulling and removal of load. Of course, had the expected bore been properly anticipated in use, a suitably larger die would have been used. In practice, now, a range of dies has been made and with proper gauge-pigging before lining commences, the true expected bore can be anticipated and a die chosen to give a 30 minute window as explained. In the third example the pipe was 10-inch. The liner diameter after 30 minute (262 mm) was found to be less than the expected bore (266 mm) of the pipe. A 30 minute window would have been a feasible option.

The purpose of giving these examples is to show that the invention provides for controlled reversion to the internal wall of the pipe. There is no need for heating or pressurization to achieve a liner tight against the internal wall. With care, the true anticipated expected bore can be known beforehand and a die chosen to give the 30 minute window to allow repairs involving stoppage of pulling.

| | | | |
|---|---|---|---|
| initial diameter of liner | 110 mm | 110 mm | 268 mm |
| die diameter | 95 mm | 90 mm | 242 mm |
| pipe diameter: expected bore | 107 mm | 102 mm | 266 mm |
| material of liner | PE-X | PE-X | PE-X |
| manufacturer of liner | UPONOR | WAVIN | Stewarts & Lloyds |
| SDR of liner | 26 | 17 | 26 |
| load of pulling | 1.0 Tonne | 1.4 Tonne | 3.75 Tonne |
| speed of pulling | 2 m/minute | 2 m/minute | 3 m/minute |
| diameter of liner: including die swell average diameter of liner: | 98 mm | 94 mm | 252 mm |
| after release of load | 102 mm | 100 mm | 258 mm |
| after 30 minutes | 107 mm | 103 mm | 262 mm |
| after 1 hour | 107 mm | 103 mm | 263 mm |
| after 24 hours | 109 mm | 105 mm | tight fit in pipe |

I claim:

1. A method of lining a pipe comprising the steps of pulling a polymer liner through a die without application of heat to the liner other than any generated by the passage of the liner through the die, or of heat used to restore that lost owing to cold weather, said die having a circular opening, having a central, longitudinal die axis and comprising an inner entry wall, an inner throat portion and an inner exit wall symmetrical about said axis wherein the entry wall decreases in diameter towards said throat portion and the exit wall increases in diameter away from the throat portion, and said pulling of the liner through the die comprises using a pulling force which does not cause yielding of the liner and which reduces the diameter of the liner with longitudinal extension of the liner, such that the liner has, before entering said throat portion, a first portion which is convex as viewed from outside the liner and which includes maximum outer and inner diameters, such that the liner has, in passing through said throat portion, a second portion which is concave as viewed from outside the liner and which includes minimum outer and inner diameters, and such that the liner has, after leaving said throat portion, a third portion which is convex as viewed from outside the liner and which includes intermediate outer and inner diameters, said intermediate outer diameter being less than the inner diameter of said pipe, the difference between said intermediate outer diameter and said minimum outer diameter being the result of die swell which occurs after the liner emerges from said die, and the liner with said die swell entering, with clearance, into the pipe, said pulling force being such that said die swell of the liner is partially restrained after the emergence thereof from said throat portion, and said method further comprising pulling the liner through the pipe, and removing the pulling load thereby causing the liner to revert, without the use of heat or pressure to a larger diameter which is substantially equal to said maximum outer diameter or which is such that the outer surface of the liner is prevented from enlarging further owing to contact with the inner surface of the pipe.

2. The method according to claim 1, in which the throat portion of the die is defined by a continuous curve joining a radius at the entry wall to a radius at the exit wall.

3. The method according to claim 1, in which the throat portion of the die comprises a short cylindrical section of not more than one centimeter in length which is joined to the entry wall and joined to the exit wall.

4. The method according to claim 1, wherein the entry wall makes an angle of 12.5° with the die axis.

5. The method according to claim 1, including pushing the liner into the pipe by utilizing pushing means which grip the liner.

6. The method according to claim 5, including pushing the liner by utilizing pushing means positioned after the die.

7. The method according to claim 1, wherein the construction of the die and the pulling force exerted are such as to provide a substantial time window before the liner reverts to the inner diameter of the pipe wall after the pulling force is removed.

8. The method according to claim 7, wherein said time window is approximately 30 minutes.

9. The method according to claim 1, including removing said die from the liner after lining of the pipe has been completed.

10. The method according to claim 9, wherein said die comprises two separable halves and including separating said halves to effect removal of the die from the liner.

11. The method according to claim 1, wherein the pipe is buried in the ground and wherein the method further comprises anchoring the die at a ground level higher than the entry end of the pipe.

12. The method according to claim 1, further comprising using a pushing device located between the die and the entry end of the pipe to push the liner into the pipe.

13. The method according to claim 12, wherein the pushing device comprises jaws, and said method further comprises using powered means extending parallel to the die axis to reciprocate said jaws, and using further powered means to effect jaw movement towards and away from the liner.

14. The method according to claim 12, further comprising supporting the die using the entry end of the pipe, the pushing device having jaws which are reciprocable between the die and the entry end of the pipe.

15. The method according to claim 1, further comprising using means forming part of the die to provide lubricant to the surfaces of the die in rubbing contact with the liner.

16. The method according to claim 1, further comprising using a lubricant to reduce friction between the liner and the pipe.

* * * * *